United States Patent [19]

Kruse et al.

[11] 4,072,628

[45] Feb. 7, 1978

[54] REGENERATION OF SUPPORTED RUTHENIUM CATALYST

[75] Inventors: Walter M. Kruse; Leon W. Wright, both of Wilmington, Del.

[73] Assignee: ICI Americas Inc., Wilmington, Del.

[21] Appl. No.: 671,966

[22] Filed: Mar. 30, 1976

Related U.S. Application Data

[63] Continuation-in-part of Ser. No. 520,926, Nov. 5, 1974, Pat. No. 3,963,788, and Ser. No. 531,972, Dec. 12, 1974, Pat. No. 3,963,789.

[51] Int. Cl.$^2$ .................. B01J 29/38; B01J 23/96; C07C 31/18
[52] U.S. Cl. ................................. 252/415; 127/37; 252/413; 260/635 C
[58] Field of Search ............................. 252/413, 415; 260/635 C; 127/37

[56] References Cited

U.S. PATENT DOCUMENTS

| | | | |
|---|---|---|---|
| 2,704,281 | 3/1955 | Appell | 252/413 |
| 2,749,359 | 6/1956 | Calkins et al. | 252/413 |
| 2,868,847 | 1/1959 | Boyers et al. | 260/635 C |
| 3,055,840 | 9/1962 | Koch, Jr. | 260/635 C |
| 3,627,636 | 12/1971 | Jaffe et al. | 127/37 |
| 3,708,396 | 1/1973 | Mitsuhashi et al. | 260/635 C |

*Primary Examiner*—Patrick P. Garvin
*Assistant Examiner*—P. E. Konopka

[57] ABSTRACT

Regeneration of supported ruthenium catalysts. A supported ruthenium catalyst which has been used for conversion of carbohydrates to polyhydric alcohols is regenerated by contacting the catalyst with an aqueous solution of a mineral acid, such as sulfuric, hydrochloric, or phosphoric acid. Dilute acids, e.g., 0.01 N to 0.5 N, are preferred.

15 Claims, No Drawings

REGENERATION OF SUPPORTED RUTHENIUM CATALYST

RELATED APPLICATIONS

This application is a continuation-in-part of our copending applications Ser. No. 520,926, filed Nov. 5, 1974, now U.S. Pat. No. 3,963,788 issue June 15, 1976 and Ser. No. 531,972, filed Dec. 12, 1974, now U.S. Pat. No. 3,963,789 issue June 15, 1976. Ser. No. 520,926 is a continuation-in-part of our earlier application Ser. No. 498,969, filed Aug. 20, 1974, now abandoned.

BACKGROUND OF THE INVENTION

This invention relates to a method for regeneration of a supported ruthenium catalyst which has been used for the conversion of a carbohydrate to a polyhydric alcohol by reaction with hydrogen.

The term "carbohydrate" as used throughout the specification and claims includes monosaccharides and polysaccharides. This term includes both pure compounds, such as glucose and sucrose, and mixtures such as cornstarch hydrolyzate, which is a hydrolysis product of cornstarch containing glucose (dextrose) and oligomers thereof.

Ther term "polysaccharide" as used in the specification and claims includes those saccharides containing more than one monosaccharide unit. This term encompasses disaccharides and other saccharides containing a small number of monosaccharide units, which are commonly known as oligosaccharides.

The term "conversion" as used herein refers to hydrogenation when applied to monosaccharides and to a combination of hydrogenation and hydrolysis when applied to polysaccharides.

Our copending parent application Ser. No. 520,926 now U.S. Pat. No. 3,963,788 describes and claims a process for the conversion of a carbohydrate to a polyhydric alcohol using a ruthenium-containing zeolite having a silica/alumina mol ratio greater than 3, particularly a ruthenium-containing Y type zeolite, as the catalyst. The ruthenium is present as the free metal on the zeolite which serves as a support. Glucose and cornstarch hydrolyzate, both of which yield sorbitol, are representative carbohydrates. Our copending parent application Ser. No. 531,972 now U.S. Pat. No. 3,963,789 describes and claims a process for conversion of a polysaccharide-containing carbohydrate, such as cornstarch hydrolyzate, to a polyhydric alcohol using ruthenium on a crystalline aluminosilicate clay as the catalyst. Both of these applications describe regeneration of the catalyst with a dilute aqueous mineral acid, as will be described and claimed herein.

Other processes for converting monosaccharides and polysaccharides to polyhydric alcohols using supported ruthenium catalysts were known prior to the inventions described in our above-cited copending applications. For example, U.S. Pat. No. 2,868,847 discloses the use of ruthenium on an inert catalyst support such as carbon, alumina, silica, or kieselguhr as a catalyst for the catalytic hydrogenation of saccharides such as dextrose, levulose, sucrose, maltose, and lactose. Starting materials include monosaccharides, e.g. dextrose and levulose, and disaccharides, e.g. sucrose, lactose, and maltose. Dextrose was hydrogenated to sorbitol and sucrose and lactose were hydrolyzed and hydrogenated to hexitols. However, maltose, a disaccharide containing two glucose units, was more easily converted to maltitol, a $C_{12}$ alcohol, according to the patent.

U.S. Pat. No. 3,055,840 discloses the hydrogenation of various carbonyl compounds, including glucose (which yields sorbitol on hydrogenation), using a promoted ruthenium catalyst on a solid carrier. Various solid carriers including carbon, silica gel, alumina, kieselguhr, bentonite, and titanium dioxide, are disclosed.

The hydrogenation of monosaccharides using a supported ruthenium, palladium, platinum, or nickel catalyst (activated carbon was used as the support in all experimental work) is discussed in an article by N. A. Vasyunina et al., "Catalytic Properties of Ruthenium in Monosaccharides Hydrogenation Reaction", in *Izvestiya Akademii Nauk SSR Khimicheskaya Seriya* 4:848–854 (1969). Ruthenium was found to have higher activity than the other three catalysts.

A two stage process for hydrogenation of ligneous and other plant material such as wood sawdust is disclosed in *Izv. Akad Nauk SSR, Otd. Khim.* 8: 1522–1523 (1960). The process consists of a first stage hydrolytic hydrogenation of polysaccharides in an acid medium, followed by a second stage hydrogenation of the lignin in an alkaline medium, using a ruthenium catalyst in both stages. In a specific embodiment, pine sawdust is treated using an aqueous phosphoric acid medium and a ruthenium on carbon catalyst. The first stage reaction product is filtered to separate the liquid medium from the crystals obtained from the first stage filtrate.

None of the above references describes regeneration of the supported ruthenium catalyst.

Various nickel catalysts for conversion of carbohydrates to polyhydric alcohols are also known. U.S. Pat. Nos. 3,538,019 and 3,670,035 and the references cited therein are examples of such catalysts.

The supported nickel catalysts described in U.S. Pat. Nos. 3,538,019 and 3,670,035 (which is a division of U.S. Pat. No. 3,538,019) have high activity for the conversion of both monosaccharides and polysaccharides, including carbohydrate mixtures such as cornstarch hydrolyzate, with high selectivity to sorbitol when either cornstarch hydrolyzate or dextrose is used as the starting material. Carbon, diatomaceous earth, and kieselguhr are disclosed as carriers. This represents a significant improvement over the process and catalyst of U.S. Pat. No. 2,868,847, since the relatively inexpensive cornstarch hydrolyzate, or other commercially available carbohydrate mixtures, can be used as the starting material in place of the much more expensive pure sugars. A disadvantage of the catalyst in U.S. Pat. Nos. 3,538,019 and 3,670,035 is that the catalyst cannot be regenerated; when reactivation is required, it is necessary to remove the active catalyst material from the support by chemical means and then to redeposit the catalyst metal on the support. Various other nickel catalysts for conversion of carbohydrates to polyhydric alcohols are cited in U.S. Pat. Nos. 3,538,019 and 3,670,035.

Although various catalytic processes for the conversion of carbohydrates to polyhydric alcohols are known in the art, none possesses all of the attributes which are desirable in such processes, e.g., ability to use inexpensive mixed carbohydrates; high selectivity to sorbitol when either glucose or a starch hydrolyzate is used as the starting material; high catalyst attrition resistance; and ease of catalyst regenerability.

SUMMARY

According to the present invention, a supported ruthenium catalyst which has been used to convert a carbohydrate to a polyhydric alcohol or mixture thereof in the presence of hydrogen is regenerated by contacting the catalyst with an aqueous solution of a water-soluble acid. The acid is preferably a mineral acid, and the preferred acid concentration is in the range of about 0.01 N to about 0.5 N.

DESCRIPTION OF THE PREFERRED EMBODIMENT

This invention will be described with reference to an overall cyclic process which includes the steps of (a) catalytically converting a carbohydrate to a polyhydric alcohol (or alcohols), and (b) regenerating the catalyst. This application is particularly directed to the catalyst regeneration procedure. Suitable carbohydrate starting materials and reaction conditions for catalytic conversion of carbohydrates to polyhydric alcohols are described in greater detail in our copending parent applications Ser. Nos. 520,926 and 531,972 cited supra.

CATALYST

Supported ruthenium catalysts which have been used for conversion of carbohydrates to polyhydric alcohols are generally capable of regeneration according to the present invention. This invention will be particularly described with reference to ruthenium-containing zeolite catalysts and to catalysts comprising ruthenium on a crystalline aluminosilicate clay, which are the catalysts described in our copending parent applications Ser. Nos. 520,926 and 531,972, respectively.

The ruthenium-containing zeolite catalysts which can be regenerated according to this invention are crystalline or essentially crystalline aluminosilicate zeolites of the molecular sieve type having a silica/alumina mol ratio of at least 3 and containing a minor catalytically effective amount of ruthenium. The preferred zeolites are synthetic. The ruthenium content of the catalyst is in the range of about 0.1% to about 5%, preferably about 0.5% to about 3%, of the total catalyst weight. The ruthenium is present as the free metal finely dispersed on the surfaces of the zeolite, which serves both as a support and as an acid catalyst for the hydrolysis of polysaccharides.

The zeolites are crystalline aluminosilicates in which the aluminum, silicon, and oxygen atoms are arranged in a rigid three-dimensional network having internal cavities of molecular size and pores of uniform size which provide access to these cavities. The crystal network includes $SiO_4$ and $AlO_4$ tetrahedra; the electronegativity of the latter is balanced by cations (e.g., metal ions, ammonium ions, or hydrogen ions). The crystal structure of zeolites has been discussed extensively in the literature and will not be discussed at length here.

Preferred ruthenium-containing zeolite catalysts are the ruthenium metal-loaded Y type zeolite catalysts. Y type zeolites are characterized by a silica/alumina mol ratio of at least about 3, and effective pore size of at least about 8 Angstrom units in the hydrogen form, and a three-dimensional network of channels. Examples of catalyst of this type are ruthenium on Ultrastable Faujasite Y (hydrogen form), ruthenium on zeolite Y (hydrogen form), and ruthenium on calcined zeolite SK-89. Ultrastable faujasite Y (hydrogen form) is commercially available from the Davison Chemical Division of W. R. Grace and Company and is described in U.S. Pat. No. 3,293,192 and in C. V. McDaniel and P. K. Maher, Society of Chemical Industry (London) Monograph No. 186 (1968); P. K. Maher, F. D. Hunter, and J. Scherzer, "Molecular Sieves", Advances in Chemistry Series No. 101 (American Chemical Society), pages 266–276 (1971); J. Scherzer and J. L. Bass, Journal of Catalysis, 28, pp. 101–115 (1973). According to U.S. Pat. No. 3,293,192, the "ultrastable" zeolite described therein has a silica/alumina mol ratio of about 3.5 to 7, and an alkali metal content less than 1%. This zeolite is prepared in the hydrogen form, but can be converted to other cationic forms. Among the cations mentioned in the patent are platinum "and other Group VIII" metal ions (no Group VIII metals other than platinum are specifically named). U.S. Pat. Nos. 3,200,082 and 3,200,083 disclose catalysts comprising noble metals including ruthenium on zeolites X, Y, and L. Zeolite Y (hydrogen or "decationized" form) is commercially available from Linde Division of Union Carbide Corporation, New York, N.Y., and is described in U.S. Pat. No. 3,130,006. Both ultrastable faujasite Y (hydrogen form) and zeolite Y (hydrogen form) can be synthesized from the sodium form of zeolite Y, which is described in U.S. Pat. No. 3,130,007. Ultrastable faujasite Y is a material of improved thermal stability in which a portion of the aluminum originally present in the zeolite crystal structure has been removed. Another highly desirable Y type zeolite catalyst is ruthenium on calcined zeolite SK-89. Zeolite SK-89 is available from Linde Division of Union Carbide Corporation.

The ruthenium-containing Y type zeolite catalysts are especially advantageous as compared to prior art catalysts when the starting material is cornstarch hydrolyzate or other starch or cellulose hydrolyzate. These catalysts give sorbitol of high purity with minimal quantities of isomers (e.g., mannitol and iditol) and other impurities and with minimal quantities of unconverted sugar in the product. These catalysts, in common with zeolite catalysts generally, have good attrition resistance which is more than sufficient for use in a liquid phase system and which exceeds the attrition resistance of catalysts having carbon carriers such as ruthenium on carbon. The ruthenium-containing Y type catalysts are readily regenerated by a simple acid wash. Ruthenium on ultrastable faujasite Y has greater acid stability than ruthenium on zeolite Y, so that small catalyst losses occur on regeneration. Ruthenium on zeolite SK-89 gives shorter reaction times than other ruthenium-containing Y type zeolite catalysts, which permits greater product output per unit of equipment.

Ruthenium on zeolite X catalysts have been found to give very poor activity as catalysts for the hydrogenation of carbohydrates. This reflects the poor hydrolytic stability of zeolite X relative to zeolite Y as is known in the art.

Another class of catalysts which can be regenerated according to this invention are catalysts comprising ruthenium on a crystalline aluminosilicate clay. These catalysts contain from about 0.1% to about 5%, preferably from about 0.5% to about 3% by weight of ruthenium, based on total catalyst weight. The ruthenium is present as the free metal finely dispersed on the surfaces of the clay, which serves as a support or carrier.

The clay minerals which are used in preparing the catalysts of this invention are hydrated crystalline aluminosilicates which have sheet or layer structures and which have base exchange capacity. These clays characteristically have a crystal structure which includes one or more tetrahedral silica layers and one or more octahedral alumina layers, with a variable amount of water and metal cations such as sodium, magnesium and calcium associated with the crystal lattice in cation or base exchange relationship. These layers are essentially two-dimensional sheet-like structures. Part of the silicon in the tetrahedral layer may be replaced by aluminum, and part of the aluminum may be replaced by other metals such as magnesium.

The clay supports for this invention should be essentially free of heavy metals, especially iron, or should have a low content of these metals. In general, clays which are suitable for use as catalysts for petroleum cracking or other petroleum processing operations are suitable as supports for the catalysts of this invention.

A preferred clay mineral is bentonite, which contains a major proportion of montmorillonite. (Bentonite is 90% montmorillonite, according to R. K. Iler, "The Colloid Chemistry of Silica and Silicates," Cornell University Press, Ithaca, N.Y., 1955, page 191.) Montmorillonite has an octahedral sheet or layer of alumina in which there may be some replacement of Al by Mg, sandwiched between two tetrahedral silica sheets in which part of the Si is replaced by Al. Montmorillonite has a nominal formula $Al_2O_3.4SiO_2.H_2O + x\ H_2O$. Montmorillonite has a high base exchange capacity.

Another suitable clay mineral is synthetic mica montmorillonite (SMM), a synthetic clay-like aluminosilicate that is generally similar to muscovite mica. SMM is described in a paper by A. C. Wright et al. in *Journal of Catalysis* 25, 65–80 (1972). Basically, SMM has an octahedral alumina layer sandwiched between two tetrahedral silica layers, with partial substitution of Al for Si in the tetrahedral layers. SMM has base exchange capacity; the ammonium ion is the predominant exchangeable ion in uncalcined SMM.

Other clay minerals having a sheet-like structure, such as kaolinite, can also be used in preparing the catalysts of this invention. The base exchange capacity of kaolinite is significantly lower than that of montmorillonite, but is sufficient for the purposes of this invention. Clay minerals having a high base exchange capacity are in general preferred, however.

The clays are preferably activated prior to impregnation with ruthenium in order to increase the surface area and hence the catalyst activity. The preferred activation procedure for most clays is acid treatment followed by calcination.

Acid treatment and calcination of clays are known procedures in the art for improving catalyst activity, and acid treatment and calcination conditions known in the art can be used in preparing the instant catalyst. The raw clay can be treated directly with an aqueous mineral acid, such as hydrochloric or sulfuric acid; this differs from the treatment of alkali metal-containing zeolites, which must be converted by ion exchange to the ammonium form and then calcined, instead of being treated directly with acid. Acid treatment and calcination greatly increases the surface area of the clay; raw clays generally have too low a surface area to be suitable as catalyst supports, while acid treated clays typically have BET surface areas greater than 100 square meters per gram and most often greater than 150 square meters per gram, which are very desirable for catalyst use. Also acid treatment reduces iron content and removes alkali metal ions such as sodium, which are detrimental to catalyst activity. Magnesium and part of the aluminum present are also removed by acid treatment, so that an acid treated clay will have a higher silica/alumina ratio than the raw clay from which it was prepared. Acid treated clays also have an appreciable number of hydrogen ion sites which serves to catalyze the hydrolysis of polysaccharides in the carbohydrate starting material to monosaccharides.

Clay minerals which have a substantial quantity of exchangeable ammonium ions, such as SMM, can be activated by calcination alone. Calcination decomposes the ammonium ions into hydrogen ions, which provides acid sites. Activated SMM typically has a BET surface area of about 135–160 $m^2$/g., the area depending largely on the temperature of activation.

The presence of sodium in amounts greater than about 1% of total catalyst weight is detrimental to catalyst activity when the starting carbohydrate is a polysaccharide-containing material such as cornstarch hydrolyzate. The presence of metal ions other than alkali metal ions is not harmful, provided the catalyst contains sufficient hydrogen ions to give the reaction medium the required acidity for hydrolysis of polysaccharides. The alkali metal content of the catalyst is not important when the starting carbohydrate is a monosaccharide (e.g., glucose) or a mixture of monosaccharides.

Ruthenium can be deposited on the surfaces of either a zeolite or a clay support by ion exchange of the activated clay with an aqueous solution of a simple ruthenium salt, such as ruthenium trichloride, followed by reduction of the ruthenium to the metallic state. Ion exchange can be accomplished by known techniques. The ruthenium can there be reduced from the trivalent to the metallic state with hydrogen either prior to putting the catalyst into service or during the first cycle of operation. Reduction can be carried out either in the dry state or in an aqueous slurry, preferably at temperatures of about 100°–200° C. in either case.

Catalysts comprising ruthenium on an activated carbon carrier, such as those described in U.S. Pat. Nos. 2,868,847 and 3,055,840 cited supra, can also be regenerated according to the present invention following their use as carbohydrate conversion catalysts.

Catalysts comprising ruthenium on alumina, or other carrier that is subject to attack by dilute aqueous mineral acid at room temperature, should not be regenerated according to the present invention. However, catalysts having supports that are attacked only slowly by dilute acid at room temperature, notably the ruthenium/zeolite and ruthenium/clay catalysts previously described, can be regenerated using the process of this invention.

CARBOHYDRATE CONVERSION

The carbohydrate starting material can be a monosaccharide or mixture thereof, or a polysaccharide-containing material. The latter term encompasses disaccharides and mixtures thereof, as well as carbohydrates comprising both a monosaccharide (or monosaccharides) and a polysaccharide or polysaccharides. Preferred polysaccharide-containing starting materials are those which are readily hydrolyzable to monosaccharides under dilute acid conditions. These readily hydrolyzable polysaccharide-containing starting materials are essentially water-soluble, and the polysaccharide content is essentially in the form of lower molecular weight polysaccharides, i.e., oligosaccharides. These starting materials for the present process are known in the art as starting materials for the production of polyhydric alcohols by catalytic hydrogenation in the case of monosaccharides, or hydrolysis and hydrogenation in the case of polysaccharides.

Monosaccharides which can be converted to polyhydric alcohols include glucose, fructose, galactose, mannose, arabinose, ribose and xylose. Mixtures of monosaccharides, and in particular invert sugar (a mixture of glucose and fructose) can also be treated. However, mixtures ordinarily should be simple mixtures that give simple mixtures of polyhydric alcohols that are easily separated.

Disaccharides which can be converted into polyhydric alcohols according to the present process include sucrose, maltose, lactose, cellobiose, and mellobiose. Raffinose is a suitable trisaccharide starting material. Other polysaccharide-containing starting materials include starch and starch decomposition products such as dextrin, glucose syrup, cellulose hydrolyzates, and starch hydrolyzates, e.g., cornstarch hydrolyzate.

Cornstarch hydrolyzate is a particularly preferred starting material in the present process because of its low cost. Other starch hydrolyzates are similar in composition to cornstarch hydrolyzate and can also be used with good results. Cornstarch hydrolyzate is a by-product of the hydrolysis of cornstarch to glucose. The hydrolyzate as produced contains some impurities, including electrolytes, which are detrimental in the present process; these impurities can be removed by treatment with a combination of a cation exchange resin and an anion exchange resin. The cation exchange resin can be either a strongly acid or weakly acid resin in the hydrogen form. The anion exchange resin is a weakly basic resin in the hydroxyl form; a strongly basic resin should not be used since this causes isomerization of some of the glucose present. The purified cornstarch hydrolyzate, which is used as a starting material for the present process, consists essentially of glucose (D-glucose or dextrose) and polymers thereof (primarily low molecular weight polymers or oligosaccharides, e.g., di-, tri-, and tetrasaccharides) which are composed entirely of glucose units and which, therefore, yield glucose as the only monosaccharide on hydrolysis. An outstanding feature of the present invention is that inexpensive and readily available carbohydrates such as cornstarch hydrolyzate can be used as starting materials with good yields of the desired polyhydric alcohol or alcohols (sorbitol when a starch hydrolyzate is the starting material) and with minimal quantities of by-products and sugars in the reaction product.

High molecular weight polysaccharides, such as cellulose and insoluble starch (e.g., cornstarch) can be used as starting materials but generally require more severe conditions of hydrolysis than those contemplated herein. These materials are more advantageously partially hydrolyzed according to the methods known in the art with the formation of a hydrolyzate such as starch or cellulose hydrolyzate.

Monosaccharides containing an aldehyde group (i.e., aldoses) are hydrogenated almost exclusively to a single polyhydric alcohol. Glucose, for example, is hydrogenated almost exclusively to sorbitol. (The presence of isomers such as mannitol and iditol is probably due to isomerization of sorbitol). Monosaccharides containing a keto group in the molecule (i.e., ketoses) are hydrogenated to a mixture of two different isomeric polyhydric alcohols. Fructose, for example, has a keto group at the second carbon atom and is hydrogenated to approximately equal amounts of sorbitol and mannitol. Invert sugar, which consists of equimolar quantities of glucose and fructose, is hydrogenated to a reaction product containing approximately three mols of sorbitol for each mol of mannitol.

Polysaccharides are hydrolyzed to their basic monosaccharide (or monosaccharides) whose aldehyde or ketone groups are then hydrogenated to hydroxyl groups to produce the desired polyhydric alcohol (or alcohols) of the monosaccharide. Those polysaccharides having free aldehyde or ketone groups in their molecular structure may have these groups hydrogenated at the same time the molecule is hydrolyzed. Both hydrolysis and hydrogenation reactions appear to take place simultaneously, and the reaction results in the desired polyhydric alcohol (or alcohols) of the basic structural monosaccharides. Polysaccharides composed of different monosaccharide units are hydrolyzed and hydrogenated to the polyhydric alcohols of the respective monosaccharides. When sucrose (whose basic structural monosaccharides are glucose and fructose) is hydrolyzed and hydrogenated, the resulting reaction product is a sorbitol-mannitol mixture in the molar ratio of approximately 3/1. Cornstarch hydrolyzate (in which the polysaccharides consist of glucose units) yields sorbitol, with isomers thereof (e.g., mannitol and iditol) present only in small by-product amounts.

An aqueous medium is used for conversion of a carbohydrate to a polyhydric alcohol. The carbohydrate (or carbohydrates) is dissolved in water at the appropriate concentration for the conversion reaction. Concentrations of carbohydrates from about 20% to about 80% by weight are usually employed for the reaction, and concentrations in the range of about 40% to about 70% by are, preferred. It is not necessary for the carbohydrates to form true solutions with the water, as suspensions and colloidal solutions of carbohydrates readily react.

The pressure, temperature, reaction time, and amount of catalyst to be used in the conversion of a carbohydrate herein may vary over a wide range. Catalyst concentrations ranging from about 0.01% to about 0.1%, preferably from about 0.02% to about 0.05% by weight of total ruthenium based on the weight of carbohydrate are suitable. The reaction may be carried out at temperatures from about 100° C. to about 200° C. and at hydrogen pressures of at least about 100 psig. The preferred ranges of pressure and temperature are from about 1000 psig to about 3000 psig and from about 140° C. to about 180° C. respectively. Reaction times are generally from about 0.25 hour (15 minutes) to about 3 hours. In general, the conversion of polysaccharide-containing materials tends to require higher catalyst levels, higher temperatures, and longer reaction times than the hydrogenation of monosaccharides. Pressures used for conversion of both monosaccharides and polysaccharides containing carbohydrates are about the same.

Monosaccharides are advantageously hydrogenated at temperatures of about 100° C. to about 160° C. The hydrogenation of a monosaccharide is ordinarily complete in an hour or less. A reaction time of at least about 0.25 hour and preferably at least about 0.5 hour is used. Excellent results can be obtained in one stage when a monosaccharide or mixture of monosaccharides is treated.

Polysaccharide-containing starting materials require a temperature of at least about 170° C. during at least a portion of the reaction period. Two stage operation is preferred. When a polysaccharide-containing carbohydrate such as cornstarch hydrolyzate is treated in a two stage process according to this invention, the preferred first stage temperatures are in the range of about 100° to about 175° C., preferably about 120° to about 160° C., and second stage temperatures range from about 170° C. to about 200° C., preferably about 175° to about 180° C. The total reaction time in a two stage treatment of a polysaccharide-containing carbohydrate is typically about 1 to 3 hours, with the first stage lasting about 0.5 to 1.5 hours and the second stage requiring about 0.5 hour to about 2 hours.

Reaction times substantially longer than those required should be avoided whenever a reaction temperature above about 160° C. is used. The catalysts used herein catalyze the isomerization of sorbitol at temperatures above 160° C., so that mannitol and in some cases iditol will be produced if contact between the catalyst and the reaction medium is continued for an unnecessarily long time.

Suitable reaction medium pH values are determined by both the catalyst support and the starting carbohydrate used.

The pH of the reaction medium should be at least about 2.5 and preferably at least about 3.0 when a clay-supported catalyst is used. When a zeolite catalyst is used, the pH of the reaction medium should be not lower than about 3 and preferably not lower than about 3.5. At pH values below the lower limits indicated, and to a lesser extent at values below the preferred minimum values, the zeolite and clay-supported catalysts tend to lose part of their crystallinity due to acid attack. The rate of deterioration increases as the pH is decreased. Carbon-supported catalysts are not susceptible to acid attack. However, regardless of the catalyst support used, it appears that the formation of certain by-products, notably hexitans such as 1,4-sorbitan, is increased as the pH value falls below about 3.

Polysaccharide-containing starting materials such as cornstarch hydrolyzate require a pH not above about 4.5 and preferably not above about 4.0, in order to obtain complete hydrolysis of polysaccharides and to avoid the presence of sugars in the product. Maintenance of the desired pH is aided by the use of a zeolite or clay-supported catalyst having not more than 1% alkali metal by weight. An acid, such as sulfuric acid or phosphoric acid, can be added to the reaction medium, either at the outset or during the reaction, e.g., between the first and second stages (the latter is ordinarily preferred), for pH control. Hydrochloric acid can also be used but is harmful to stainless steel equipment.

Monosaccharides such as glucose can be hydrogenated over a much wider pH range than polysaccharide-containing carbohydrates. Both acidic and neutral media (e.g., media having a pH up to about 7.5) are suitable for hydrogenation of monosaccharides.

The reactants may be added to the reaction chamber in any suitable manner or in any suitable order. It is preferred to add the catalyst to the aqueous solution or suspension of the carbohydrate and then add the hydrogen under pressure and commence heating the mixture to the desired temperature.

The reaction is carried out in any suitable type of apparatus which enable intimate contact of the reactants and control of the operating conditions and which is resistant to the high pressures involved. The process may be carried out in batch, semi-continuous, or continuous operation. Batch operation in a conventional autoclave gives excellent results.

Upon completion of the reaction, the catalyst is removed by filtration or decantation and the polyhydric alcohol may be separated from the filtrate by any suitable means, such as filtration, washing, crystallization, solvent extraction, or evaporation. Any electrolytes which may be present in the filtrate may be removed prior to recovery of the polyhydric alcohols by passage through a mixed ion exchange bed which contains both a cation exchange resin and an anion exchange resin.

CATALYST REGENERATION

The catalyst is regenerated by washing or otherwise contacting the catalyst with a dilute aqueous mineral acid, such as sulfuric acid, hydrochloric acid, or phosphoric acid at room temperature. Alternatively, a water soluble organic acid such as acetic acid can be used. Acid concentrations ranging from about 0.01 N to about 0.5 N can be used to regenerate zeolite and clay supported catalysts. While acid concentrations higher than 0.5 N effectively regenerate the catalyst, they also cause partial loss of crystallinity of zeolite and clay supports due to dissolution of part of the alumina and therefore should be avoided. The acid wash is preferably followed with a water wash. When the catalyst is separated from the reaction product by filtration, the wet catalyst may be acid washed on the filter. The catalyst should be acid washed after each use when a starch or cellulose hydrolyzate is treated; failure to acid wash usually results in appreciably reduced activity during the next use. Less frequent regeneration will suffice when the starting material is a monosaccharide. A complete operating cycle includes reaction of a carbohydrate as above described followed by catalyst regeneration.

This regeneration method can also be applied to other supported ruthenium catalysts, e.g., ruthenium on carbon, which have been used for the conversion of carbohydrates to polyhydric alcohols. Higher acid concentrations can be used in regenerating a ruthenium on carbon catalyst than are permissible in regenerating a ruthenium on zeolite or clay catalyst. An acid concentration of at least about 0.01 N should be used to regenerate ruthenium on carbon catalysts.

Ruthenium on alumina or other support of high alumina content should not be regenerated according to the present process, because such supports are attacked even by dilute mineral acids as already noted.

A major advantage of the catalysts used in the present invention is that they can be regenerated by a simple acid wash, and do not require removal from the carrier (i.e., by dissolution) or redeposition on the carrier.

Another major advantage of the catalysts used herein is that they give good yields of desired polyhydric alcohols with minimal quantities of undesired polyhydric alcohols, other impurities, and unconverted sugars in the reaction product, even when inexpensive and readily available polysaccharide-containing carbohydrates such as cornstarch hydrolyzate are used.

EXAMPLES

This invention will now be described further with respect to the examples which follow. All percentages refer to percentage by weight unless otherwise indicated. Product analyses are on the dry basis unless otherwise reported. The term "cornstarch hydrolyzate," whenever used in the examples, refers to a cornstarch hydrolysis product containing on the dry basis, 63% (by weight) glucose, about 17% disaccharides, about 4% trisaccharides, about 3% tetrasaccharides, and about 12% higher polysaccharides, which has been treated with an anion exchange resin and a cation exchange resin in order to remove impurities.

EXAMPLE 1

CATALYST PREPARATION

A solution of ruthenium trichloride was prepared by dissolving 0.5 grams of $RuCl_3$ (40% Ru; Engelhard) in 200 ml. of distilled water. To this solution in a one-liter beaker was added a slurry of 20 grams of Ultrastable Faujasite Y ($H^+$ form: 0.5%Na) (W. R. Grace & Company, Davison Chemical Division) in 300 ml. of distilled water. The slurry was heated on an electric hotplate with magnetic stirring at 70°–80° C. for one hour. The slurry was filtered and washed with 350-ml. portions of distilled water. The colorless filtrate was shown to contain less than one part per million of ruthenium. The ruthenium-exchanged Ultrastable Faujasite Y was dried for two hours at 140° C. in a vacuum oven. The dried product was slurried in water and reduced at 120° C. and 50 psig. for 2 hours, then dried at 140° C. The resulting catalyst contained 1% by weight of ruthenium and 0.5% by weight of sodium.

Conversion of Cornstarch Hydrolyzate

Five successive operating cycles were carried out in which cornstarch hydrolyzate was converted to sorbitol in a two stage process using the catalyst described above, followed by acid rejuvenation of the catalyst.

A slurry containing 100 grams of cornstarch hydrolyzate, 3.00 grams of catalyst, and about 90–95 grams of water, was prepared by first dissolving the cornstarch hydrolyzate in about 65–70 grams of water and then adding the catalyst and the remaining 25 grams of water, all under an inert atmosphere. The pH of the slurry (which will be called "initial pH") was determined and the slurry was charged to a one-liter autoclave equipped with a stirrer while maintaining the inert atmosphere. Fresh catalyst was used in the first cycle; dried reused catalyst recovered from the previous cycle plus enough makeup catalyst to give a total catalyst weight of 3.00 grams was used in the subsequent cycles.

The autoclave was purged with nitrogen and hydrogen, pressured with hydrogen to about 1500–1550 psig. at room temperature, heated to the first stage reaction temperature (160° C.) and pressure (about 2000 to 2050 psig.), and maintained at this temperature for 35 minutes. Some pressure drop (approximately 130–175 psig.) occurred during the first stage. Then 3 ml. of 0.36 N sulfuric acid, diluted to 15 ml., was added to the autoclave by displacement at about 1900–2000 psig. hydrogen pressure. The autoclave contents were heated to the second stage reaction temperature (175° C.) and pressure (about 2025–2145 psig.) and were maintained at this temperature for 90–95 minutes. Some pressure drop (approximately 30–75 psig.) occurred during the second stage. The reaction temperature was maintained until a constant pressure was observed for about 30 minutes.

The autoclave contents were cooled to room temperature, discharged from the autoclave, and filtered on a Buechner funnel to separate the catalyst from the reaction product. The pH of the filtrate (i.e., the reaction product) was determined; this value is reported as "final pH". The filtrate was concentrated to approximately 70% solids and analyzed. All analyses are reported on the dry basis.

The catalyst on the Buechner funnel was regenerated by washing with 50 ml. of 0.07 N sulfuric acid and then with 50 ml. of water and weighed after each cycle.

Operating conditions and product analyses (in weight percent on the dry basis) for each cycle are given in Table 1 below. Complete analysis of the first cycle reaction product was not made because of the high sugar content, indicating incomplete hydrolysis and an unsatisfactory product. Lower yields of sorbitol and larger amount of by-products are generally obtained with fresh catalysts then with previously used catalysts.

TABLE 1

| Cycle | 1 | 2 | 3 | 4 | 5 |
|---|---|---|---|---|---|
| Catalyst reuse | 0 | 1 | 2 | 3 | 4 |
| Initial pH | 5.2 | 3.9 | 3.7 | 3.6 | 3.7 |
| Final pH | 4.5 | 4.0 | 3.8 | 4.0 | 3.6 |
| First Reaction Stage | | | | | |
| Pressure, psig. | 1990 | 2030 | 2030 | 2025 | 2050 |
| Temp., ° C. | 160 | 160 | 160 | 160 | 160 |
| Time, min. | 35 | 35 | 35 | 35 | 35 |
| Second Reaction Stage | | | | | |
| Pressure, psig. | 2060 | 2150 | 2145 | 2035 | 2025 |
| Temp., ° C. | 175 | 175 | 175 | 175 | 175 |
| Time, min. | 95 | 90 | 90 | 90 | 90 |
| Product Analysis | | | | | |
| Sorbitol | — | 94.0 | 92.4 | — | 93.8 |
| Mannitol | — | 2.04 | 2.47 | — | 2.95 |
| Hexitans | — | 1.29 | 3.15 | — | 2.11 |
| Total non-sugar Impurities | — | 4.07 | 6.08 | — | 5.76 |
| Reducing Sugar | 0.03 | 0.04 | 0.04 | — | 0.04 |
| Total Sugar | 3.94 | 0.36 | 0.18 | — | 0.15 |
| Sorbitol by difference | — | 95.6 | 93.7 | — | 94.1 |

Notes
1. Pressure for each reaction stage is initial pressure; some pressure drop occurs during each stage due to hydrogen consumption.
2. "Hexitans" includes 1,4-sorbitan and other hexitans.

EXAMPLE 2

The catalyst used in this example was 1% Ru on Ultrastable Faujasite Y ($H^+$ form; W. R. Grace) containing 0.6% Na and prepared by ion exchanging a quantity of Ultrastable Faujasite Y ($H^+$ form,).6% Na with ruthenium chloride solution and reducing the ruthenium to the metallic state in a stream of flowing hydrogen at 150° C. and atmospheric pressure for 30 minutes. This catalyst was used in a total of 25 operating cycles (i.e., 24 reuses), using cornstarch hydrolyzate as the starting material.

Three different modes of operation were used in different cycles in this example. The first mode, designated as Mode A, was similar to the reaction procedure of Example 1, i.e., two-stage operation with acid added at the beginning of the second stage, except for minor differences in reaction temperatures, times, and quanitites of acid, and in the use of hydrochloric acid instead of sulfuric acid in one cycle. The second mode, designated as Mode B, was also a two-stage process, but acid (sulfuric or hydrochloric) was added to the initial slurry of catalyst and cornstarch hydrolyzate. The third mode, designated as Mode C, was a one-stage process using a uniform reaction temperature (150° to 175° C.) throughout the cycle with acid added to the initial catalyst/cornstarch hydrolyzate slurry. Separation of the catalyst from the reaction product, and analysis of the reaction product in all three modes were as described in Example 1. The catalyst was regenerated by washing with 50 ml of 0.36 N sulfuric acid and then with water after each cycle. The fresh zeolite support had a crystallinity of 80%, and the catalyst after 25 cycles had a crystallinity of 75%.

Operating conditions and results for representative cycles are given in Table II below.

TABLE II

| Cycle | 9 | 17 | 24 | 25 |
|---|---|---|---|---|
| Catalyst Reuse | 8 | 16 | 23 | 24 |
| Mode | B | C | A | A |
| Initial pH | — | 3.0 | 4.1 | — |
| Final pH | 3.5 | 3.3 | 3.6 | 3.7 |
| First Stage: | | | | |
| Temp., ° C. | 160 | 170 | 175 | 160 |
| Time, min. | 30 | 120 | 30 | 45 |
| Acid added, meq. | 0.2 | 0.36 | — | — |
| Second Stage: | | | | |
| Temp., ° C. | 180 | One | 175 | 175 |
| Time, min. | 40 | Stage | 120 | 85 |
| Acid added, meq. | — | — | 0.36 | 0.36 |
| Product Analysis: | | | | |
| Sorbitol | 90.0 | 90.0 | 92.0 | 91.6 |
| Mannitol | 2.38 | 3.14 | 2.47 | 2.18 |
| Hexitans | 2.57 | 1.50 | 2.05 | 1.68 |
| Total non-sugar impurities | 5.23 | 6.31 | 5.92 | 4.87 |
| Reducing sugar | 0.05 | 0.35 | 0.05 | 0.09 |
| Total sugar | 0.14 | 2.19 | 0.86 | 1.63 |
| Sorbitol by difference | 94.6 | 91.5 | 93.2 | 93.5 |

Good sorbitol yields were generally obtained in two-stage modes of operation. Results obtained in one-stage operations were generally satisfactory at reaction temperatures of 170° C., as illustrated by Cycle 17 but not satisfactory at temperatures of 150° and 160° C. However, a low sorbitol yield (78%) was obtained in another cycle that was run at 170° apparently due to too short a reaction time and too low a pH (2.6) at the start. There was virtually no loss in crystallinity of the catalyst, indicating that the acid concentrations used both in reaction and in regeneration were within acceptable limits.

EXAMPLE 3

The catalyst used in this example was 1% Ru on zeolite Y ($H^+$ form). Zeolite Y ($NH_4^+$ form), purchased from Linde Division of Union Carbide Corporation as SK-41, was calcined for 3 hours at 550° C. to give zeolite Y ($H^+$ form). This zeolite as received contained 23.0% $Al_2O_3$, 65.0% $SiO_2$ and 2.4% $Na_2O$ by weight on the anhydrous basis. The zeolite Y ($H^+$ form) was exchanged with aqueous $RuCl_3$ solution and dried, and the trivalent ruthenium was reduced to metallic ruthenium with hydrogen at 150° C.

An aqueous solution of cornstarch hydrolyzate was catalytically treated with hydrogen in the presence of the abovedescribed Ru on zeolite Y catalyst as described in Example 1. The catalyst was regenerated by acid washing after each cycle as described in Example 1, except that 0.05% phosphoric acid was used instead of sulfuric acid after the third cycle. A total of four cycles were run. Sorbitol assays (excluding the first cycle) ranged from 91.2% to 91.7% on the dry basis. Sugar values were quite low except in the fourth cycle. However, mannitol production in each cycle was fairly high, ranging from 2.54% to 4.18% (dry basis).

EXAMPLE 4

The catalyst used in this example was a 1% Ru on a Y type zeolite catalyst. The zeolite was obtained from Linde Division of Union Carbide Corporation as SK-89. The SK-89 zeolite was calcined for 4 hours at 600° C., yielding a Y type zeolite in the $H^+$ form. This zeolite was exchanged with aqueous $RuCl_3$ solution, dried and reduced at 150° C. in flowing hydrogen for 0.5 hours.

An aqueous solution of cornstarch hydrolyzate was catalytically hydrogenated with 2 grams of the above described 1% Ru on zeolite catalyst (giving a Ru/carbohydrate ratio of 0.02%) essentially as described in Example 1, except that two cycles (i.e., one cycle using fresh catalyst and one cycle employing a reused catalyst) were carried out. The first reaction stage initial pressure was 2050 psig. (dropping to 1910 psig.); the temperature was 160° C. and the reaction time 45 minutes. The second reaction stage initial pressure was also 2050 psig. the temperature was 175° C. and the reaction time was 45 minutes. The catalyst was regenerated with sulfuric acid as described in Example 1 after each cycle. The second cycle product analyzed, on the dry basis, 96.1% sorbitol, 1.80% hexitans, 1.70% mannitol, 0.17% reducing sugar and 0.61% total sugar. This example shows that the second stage reaction time can be decreased by a factor of two by use of this catalyst.

EXAMPLE 5

A catalyst consisting of 1% ruthenium on synthetic mordenite ("Zeolon 100", $H^+$ form) was prepared by ion exchange of 20 grams of "Zeolon 100" ($H^+$ form) (supplied by Norton Co.) with 500 mg of aqueous ruthenium chloride at room temperature. This catalyst was tested for glucose hydrogenation activity by hydrogenating an aqueous solution of glucose for one hour at 110° C. and 1700 psig. initial hydrogen pressure, following the procedure of Example 5. The product contained 97% sorbitol by GLC analysis.

The catalyst was recovered from the reaction product slurry by filtration, acid washed with 100 ml. of 0.36 N sulfuric acid and dried (2.7 grams). This catalyst and 0.3g of make-up catalyst ion again tested for glucose hydrogenation activity under conditions identical with those in the first cycle. However, in the second cycle of operations, the catalyst showed poor glucose hydrogenation activity; the reaction product contained 53% sorbitol, 42% glucose, and 4.4% hexitans. This suggests that synthetic mordenite would not be a good support for catalysts of this invention, since reusability is essential from the economic standpoint.

EXAMPLE 6

This example describes the production of sorbitol from cornstarch hydrolyzate using, as the catalyst, 1% by weight ruthenium on an acid-treated calcined montmorillonite clay.

The catalyst support used in this example was an acid-treated calcined montomorillonite clay sold under the designation "K-10" by Chemetron Corporation. This material is a powder which typically contains about 64.7% by weight silica and 19.3% by weight alumina, and which typically has a pH of about 3.5 in a 1:10 (by weight) clay/water slurry, a bulk density of about 373 g/liter, a specific gravity of about 2.4–2.5, and a surface area of 268 $m^2/g$.

To prepare the catalyst, a slurry of 20 grams of "K-10" montmorillonite clay in 300 ml. of distilled water was added to a solution of 0.5 grams of ruthenium chloride (40% Ru) in 200 ml. of distilled water in a one-liter beaker. The resulting slurry was heated on an electric hot plate with magnetic stirring at 70°–80° C. for one hour. During this time the color of the slurry changed from gray-greenish to gray. The slurry was filtered and washed with three 50-ml. portions of distilled water. Analysis of the filtrate showed less than 1 ppm Ru. The ruthenium-exchanged catalyst was dried in an oven for 12 hours at 100° C. and was used without reduction.

Five operating cycles were carried out in which cornstarch hydrolyzate was converted to sorbitol using the catalyst described above, followed by acid regeneration of the catalyst.

An aqueous slurry was prepared by slurrying 3.0 grams of the above-described catalyst in an aqueous solution of cornstarch hydrolyzate containing 100 grams of sugar solids and having a solids concentration of about 68–70% by weight. The pH of the slurry (which will be called "initial pH") was determined and the slurry was charged in an inert atmosphere to a one-liter autoclave equipped with a stirrer. Fresh catalyst was used in the first cycle; dried, reused catalyst recovered from the previous cycle plus enough makeup catalyst to give a total catalyst weight of 3.0 grams was used in the subsequent cycles. The ruthenium content of the catalyst was reduced from the trivalent to the metallic form during the first cycle.

Conversion of cornstarch hydrolyzate to sorbitol was carried out in two stages, at temperatures of 160° C., and 175° C., respectively. The autoclave was purged with nitrogen and hydrogen, pressured with hydrogen to about 1500–1550 psig. at room temperature, and heated to 160° C. The pressure rose during heating to about 1900–2000 psig. (There were some variations from cycle to cycle.) The temperature was maintained at 160° C. for 30–47 minutes (exact times for each cycle are indicated in Table I below) during the first reaction stage. Some pressure drop (typically about 120–180 psig.) occurred due to hydrogen consumption. Then 3 ml. of 0.36 N sulfuric acid, diluted to 15 ml. with distilled water, was added to the autoclave by hydrogen displacement. (This raised the pressure to about 2000 psig. at 160° C.) The autoclave contents were heated to 175° C. and maintained at this temperature for 30 minutes. A slight pressure drop (typically about 30 psig.) occurred during the second stage of each cycle.

The autoclave contents were cooled to room temperature, discharged from the autoclave, filtered, ion-exchanged through a mixed bed of ion-exchange resins, concentrated to about 70% solids and analyzed. The pH of the reaction product (final pH) was determined before filtration.

The catalyst on the Buechner funnel was regenerated by washing with three 50-ml. portions of dilute aqueous 0.36 N sulfuric acid.

Operating conditions and product analyses (in percent by weight on dry basis) for the second, third and fourth cycles are given for each cycle in Table III.

TABLE III

| Cycle | 2 | 3 | 4 |
|---|---|---|---|
| Catalyst re-use | 1 | 2 | 3 |
| Initial pH | 3.3 | 3.2 | 3.2 |
| Final pH | 3.0 | 2.9 | 2.9 |
| First stage: | | | |
| Temp., ° C., | 160° | 160° | 160° |
| Time, min. | 35 | 40 | 45 |
| Second stage: | | | |
| Temp., ° C., | 175° | 175° | 175° |
| Time, min. | 30 | 30 | 30 |
| Product: | | | |
| Sorbitol | 91.7 | 90.7 | 92.7 |
| Mannitol | 1.92 | 2.27 | 2.67 |
| Total non-sugar impurities | 5.73 | 6.24 | 5.04 |
| Reducing sugar | 0.04 | 0.09 | 0.22 |
| Total sugar | 0.07 | 0.15 | 0.30 |
| Sorbitol by difference | 94.2 | 93.6 | 94.7 |

TABLE III-continued

| Cycle | 2 | 3 | 4 |
|---|---|---|---|
| difference | 94.2 | 93.6 | 94.7 |

The first cycle product was not analyzed in its entirety, since conversion to sorbitol tend to be less selective in the first cycle than in subsequent cycles.

The fifth cycle reaction product contained 1.95% by weight (dry basis) total sugar, of which 1.45% was reducing sugar. Reaction conditions in the fifth cycle were similar to those in the fourth cycle. The high reducing sugar value suggests incomplete hydrogenation of glucose present in the cornstarch hydrolyzate, which in turn suggest diminished catalyst activity.

The value, "sorbitol by difference" in Table I above (and in Tables II and III which follow) is determined by adding "total non-sugar impurities" and "total sugar" (which gives total impurities) and subtracting the sum from 100.

EXAMPLE 7

This example describes the production of sorbitol from cornstarch hydrolyzate using, as the catalyst, 1% by weight ruthenium on a montmorillonite clay in the hydrogen form, obtained by ion exchange of the starting clay with ammonium ions followed by calcination.

The montmorillonite clay ("K-10", Chemetron) was ion exchanged with aqueous ammonium nitrate, dried in a vacuum oven at 140° C. for 4 hours, calcined at 425° C. for 14 hours, and then ion exchanged with ruthenium chloride as described in Example 1. The ruthenium-exchanged clay was treated with a flowing stream of hydrogen at 150° C. for 30 minutes to reduce the ruthenium to the metallic state. Reduction was carried out prior to first use of the catalyst.

Seven operating cycles were carried out in which cornstarch hydrolyzate was converted to sorbitol using the catalyst described above, followed by regeneration of the catalyst with acid. Both conversion and regeneration were carried out according to the procedure described in Example 1, except for differences in the first and second stage conversion times as indicated in Table IV below. Table IV indicates operating conditions and product analyses in percentage by weight on the dry basis for the first, second, sixth, and seventh cycles.

TABLE IV

| Cycle | 1 | 2 | 6 | 7 |
|---|---|---|---|---|
| Catalyst re-use | 0 | 1 | 5 | 6 |
| Initial pH | 3.6 | 3.3 | 3.2 | 3.2 |
| Final pH | 2.9 | 3.0 | 2.9 | 2.9 |
| First stage: | | | | |
| Temp., ° C. | 160° | 160° | 160° | 160° |
| Time, min. | 45 | 65 | 60 | 65 |
| Second stage: | | | | |
| Temp., ° C. | 175° | 175° | 175° | 175° |
| Time, min. | 30 | 30 | 30 | 30 |
| Product: | | | | |
| Sorbitol | 92.2 | 92.4 | 92.7 | — |
| Mannitol | 1.61 | 2.30 | 1.88 | — |
| Total non-sugar impurities | 3.79 | 5.18 | 4.76 | — |
| Reducing sugar | 0.09 | 0.11 | 0.19 | 0.89 |
| Total sugar | 0.73 | 0.15 | 0.32 | 1.25 |
| Sorbitol by difference | 95.5 | 94.7 | 94.9 | — |

Complete analyses of the third, fourth, and fifth cycles were not made because of the relatively high total sugar contents in the products of each of these cycles.

EXAMPLE 8

This example describes the production of sorbitol from cornstarch hydrolyzate using, as the catalyst, 1% by weight ruthenium on synthetic mica montmorillonite (SMM).

The synthetic mica montmorillonite used in this example was obtained from Baroid Division of NL Industries under the name BARASYM SMM. Ruthenium was incorporated by ion exchange using the procedure of Example 1. The trivalent ruthenium in the ruthenium-exchanged SMM was reduced with a stream of hydrogen at 150° C. for 30 minutes.

Six operating cycles were carried out in which cornstarch hydrolyzate was converted to sorbitol using the catalyst described above, followed by acid regeneration of the catalyst. Both conversion and regeneration were carried out according to the procedure of Example 1, except for differences in first and second stage reaction times during conversion as indicated in Table V below. Table V indicates operating conditions and product analyses in percentage by weight on the dry basis for the first, fourth, fifth, and sixth cycles.

TABLE V

| Cycle | 1 | 4 | 5 | 6 |
|---|---|---|---|---|
| Catalyst re-use | 0 | 3 | 4 | 5 |
| Initial pH | 4.2 | 3.5 | 3.6 | 3.6 |
| Final pH | 3.6 | 3.0 | 3.4 | 3.2 |
| First stage: | | | | |
| Temp., ° C. | 160° | 160° | 160° | 160° |
| Time, min. | 30 | 60 | 65 | 80 |
| Second stage: | | | | |
| Temp., ° C. | 175° | 175° | 175° | 175° |
| Time, min. | 30 | 30 | 40 | 32 |
| Product: | | | | |
| Sorbitol | — | 91.3 | 91.1 | 89.6 |
| Mannitol | — | 2.35 | 2.75 | 3.19 |
| Total non-sugar impurities | — | 5.76 | 5.77 | 5.86 |
| Reducing sugar | 0.19 | 0.21 | 0.24 | 0.67 |
| Total sugar | 0.70 | 0.28 | 0.42 | 0.95 |
| Sorbitol by difference | — | 94.0 | 93.8 | 93.2 |

EXAMPLE 9

This example describes the production of sorbitol from cornstarch hydrolyzate using 1% by weight ruthenium on activated carbon as the catalyst.

Four operating cycles were carried out in which cornstarch hydrolyzate (100 grams, dry basis) was converted to sorbitol using 2 forms of 1% ruthenium on carbon as the catalyst, followed by regeneration of the catalyst with sulfuric acid as described in Example 1 after each conversion cycle. Conversion was carried according to the procedure of Example 1 except for differences in reaction conditions indicated in Table VI below. As in Example 1 3 ml of 0.36 N sulfuric acid was added between the first and second stages of each conversion cycle.

TABLE VI

| Cycle | 1 | 2 | 3 | 4 |
|---|---|---|---|---|
| Catalyst reuse | 0 | 1 | 2 | 3 |
| Initial pH | 6.4 | 3.0 | 3.0 | 3.1 |
| Final pH | 3.1 | 3.0 | 3.1 | 3.0 |
| First stage: | | | | |
| Temp., ° C. | 160° | 160° | 160° | 160° |
| Time, min. | 30 | 35 | 30 | 30 |
| Second stage: | | | | |
| Temp., ° C. | 175° | 175° | 175° | 175° |
| Time, min. | 30 | 35 | 38 | 15 |
| Product analysis: | | | | |
| Sorbitol | 86.0 | 87.2 | 92.2 | 94.8 |
| Mannitol | 5.18 | 4.27 | 2.24 | 1.04 |
| Iditol | 4.32 | 4.11 | 1.15 | 0.58 |

TABLE VI-continued

| Cycle | 1 | 2 | 3 | 4 |
|---|---|---|---|---|
| Total non-sugar impurities | 12.64 | 12.23 | 6.11 | 3.22 |
| Reducing sugar | 0.30 | 0.03 | 0.03 | 0.06 |
| Total sugar | 0.12 | 0.08 | 0.04 | 0.67 |
| Sorbitol by difference | 87.2 | 88.7 | 93.8 | 96.0 |

The low initial pH of the reaction medium in each cycle except the first is due to the residual acid from the preceding regeneration cycle on the surfaces of the catalyst support. This low pH is beneficial in the conversion of cornstarch hydrolyzate.

EXAMPLE 10

This example describes the conversion of cornstarch hydrolyzate to sorbitol using 1% ruthenium on carbon as the catalyst. The procedure used was the same as in Example 9 with the following exceptions: (1) Quantities of catalyst and reaction times are shown in Table VII; and (2) the catalyst was regenerated with 1 M acetic acid after the third cycle, with 1 M sulfuric acid after the sixth cycle, and with 0.36 M sulfuric acid after all other cycles except the last. Eight cycles were carried out. Results of all cycles except the first and last are given in Table VII below.

TABLE VII

| Cycle | 2 | 3 | 4 | 5 | 6 | 7 |
|---|---|---|---|---|---|---|
| Initial pH | 2.2 | 2.3 | 4.2 | 3.0 | 3.0 | 3.0 |
| Final pH | 2.8 | 3.0 | 3.5 | 3.0 | 3.1 | 3.0 |
| Cat. wt. g | 4 | 3 | 5 | 3 | 3 | 3 |
| Time (min): | | | | | | |
| 1st stage | 35 | 80 | 45 | 90 | 130 | 136 |
| 2nd stage | 60 | 60 | 60 | 60 | 60 | 60 |
| Regenerant | A | A | C | A | A | B |
| Analysis: | | | | | | |
| Sorbitol | 90.0 | 93.8 | 91.1 | 91.3 | 89.8 | 88.4 |
| Mannitol | 2.25 | 1.83 | 1.65 | 1.88 | 1.92 | 1.83 |
| Iditol | 1.16 | 0.16 | 0.54 | 0.27 | — | — |
| *Imp. | 8.89 | 4.79 | 3.76 | 4.96 | 5.23 | 5.19 |
| R.S. | 0.02 | 0.03 | 0.21 | 0.09 | 0.28 | 0.82 |
| T.S. | 0.05 | 0.20 | 2.97 | 1.24 | 1.96 | 2.04 |

Notes:
A = 0.36 M sulfuric acid
B = 1 M sulfuric acid
C = 1 M acetic acid
*Total non-sugar impurities
R.S. = reducing sugar
T.S. = Total sugar
Temperatures: first stage 160° C., second stage 175° C., in all cycles.

In Table VII above, the regenerant indicated is the acid used before the conversion cycle indicated.

The first cycle reaction product contained 86.8% by weight sorbitol and 10.37% by weight total non-sugar impurities, both dry basis. The initial pH was 6.5 and the final pH was 2.8. The catalyst was not acid washed prior to the first cycle, which accounts for the high initial pH.

The eight cycle reaction product showed 4.6% by weight (dry basis) reducing sugar, and no further analysis was made.

Based on the above data, sulfuric acid and acetic acid solutions appear to be equally good as catalyst regenerants.

What is claimed is:

1. A process for regenerating a supported ruthenium catalyst which has been used to convert a carbohydrate in an aqueous medium at a pH of about 3 to about 7.5 to a polyhydric alcohol or mixture of polyhydric alcohols in the presence of hydrogen under elevated pressure at a temperature in the range of about 100° C. to about 200° C., said process comprising separating said catalyst from the reaction medium and contacting said catalyst with a dilute aqueous solution of a water soluble acid, the concentration of said aqueous solution of said water soluble acid being such as to effectively regenerate said catalyst without dissolving an appreciable portion of the support.

2. A process according to claim 1 in which said acid is a mineral acid.

3. A process according to claim 2 in which said acid is selected from the group consisting of sulfuric acid, hydrochloric acid, and phosphoric acid.

4. A process according to claim 3 in which said acid is sulfuric acid.

5. A process according to claim 1 in which said solution has an acid concentration in the range of about 0.01 N to about 0.5 N.

6. A process according to claim 1 in which said catalyst is a ruthenium-containing aluminosilicate zeolite of the Y type.

7. A process according to claim 1 in which said catalyst comprises ruthenium on an acid-activated crystalline aluminosilicate clay having base exchange capacity.

8. A process according to claim 7 in which said clay is of the montmorillonite type.

9. A process according to claim 1 in which said carbohydrate is an essentially water-soluble polysaccharide-containing carbohydrate.

10. A process according to claim 9 in which said carbohydrate is cornstarch hydrolyzate.

11. A process according to claim 1 in which said catalyst is contacted with said aqueous solution of said water soluble acid at approximately room temperature.

12. A process according to claim 5 in which the catalyst support is a Y type zeolite or an acid activated aluminosilicate clay having base exchange capacity.

13. A process according to claim 1 in which said carbohydrate is an essentially water soluble water polysaccharide-containing carbohydrate, the catalyst support is carbon or a crystalline aluminosilicate selected from the group consisting of Y type zeolites and acid-activated clays having base exchange capacity, and the acid is a water soluble mineral acid.

14. A process according to claim 13 in which said solution has an acid concentration in the range of about 0.1 N to about 0.5 N, the catalyst support is a Y type zeolite or an acid activated crystalline aluminosilicate clay having base exchange capacity, and said catalyst is contacted with said solution of said acid at approximately room temperature.

15. A process according to claim 13 in which the catalyst is washed with water following contact with said water soluble acid.

* * * * *